(12) United States Patent
Sinha et al.

(10) Patent No.: US 12,086,047 B2
(45) Date of Patent: Sep. 10, 2024

(54) AUTOMATED APPLICATION PROGRAM INTERFACE TESTING

(71) Applicant: SAP SE, Walldorf (DE)

(72) Inventors: Kirti Sinha, Delhi (IN); Vipul Khullar, New Delhi (IN); Soma Shekara Pavan Kumar Marla, Bangalore (IN); Akansha Tiwari, Gurgaon (IN); Naresh Pidugu, Bangalore (IN)

(73) Assignee: SAP SE, Walldorf (DE)

( * ) Notice: Subject to any disclaimer, the term of this patent is extended or adjusted under 35 U.S.C. 154(b) by 357 days.

(21) Appl. No.: 17/732,949

(22) Filed: Apr. 29, 2022

(65) Prior Publication Data

US 2023/0350776 A1  Nov. 2, 2023

(51) Int. Cl.
*G06F 11/34* (2006.01)
*G06F 9/54* (2006.01)
*G06F 11/36* (2006.01)

(52) U.S. Cl.
CPC ......... *G06F 11/3428* (2013.01); *G06F 9/547* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 9,159,024 B2 | 10/2015 | Bhanot et al. | |
| 9,646,041 B2 | 5/2017 | Foebel et al. | |
| 2021/0192650 A1* | 6/2021 | Hunn | G06F 16/93 |

OTHER PUBLICATIONS

Karlsson, Stefan, et al., "QuickREST: Property-based Test Generation of OpenAPI-Described RESTful APIs", arXiv:1912.09686v1, (Dec. 20, 2019), 11 pgs.

* cited by examiner

*Primary Examiner* — Raul J Rios Russo
*Assistant Examiner* — Carl F. R. Tchatchouang
(74) *Attorney, Agent, or Firm* — SCHWEGMAN LUNDBERG & WOESSNER, P.A.

(57) ABSTRACT

Various examples are directed to systems and methods for evaluating an Application Program Interface (API) for interfacing an application to a database through a data model. A computing system may access a first view data structure associated with a first API call. The computing system may use a first view data structure to select a first table from the one or more tables, the first table being associated with the first API call, where the data model is described by a plurality of view data structures based on one or more tables at a database, including the first view data structure. The computing system may measure the API against a standard of performance for the API using a first performance double view data structure and a first performance double table.

20 Claims, 11 Drawing Sheets

AUTOMATED APPLICATION PROGRAM INTERFACE TESTING

BACKGROUND

Application Program Interfaces (APIs) are used to interface one computing component to another. The computing components may be hardware components and/or software components. An API provides a set of calls or commands that can be understood by both computing components. For example, a sending computing component may send the API an API call requesting that a receiving computing component perform a requested action, such as a read or write action. The API may convert the API call to a format that will prompt the receiving computing component to perform the requested action.

BRIEF DESCRIPTION OF DRAWINGS

The present disclosure is illustrated by way of example and not limitation in the following figures.

DETAILED DESCRIPTION

Figure 1:
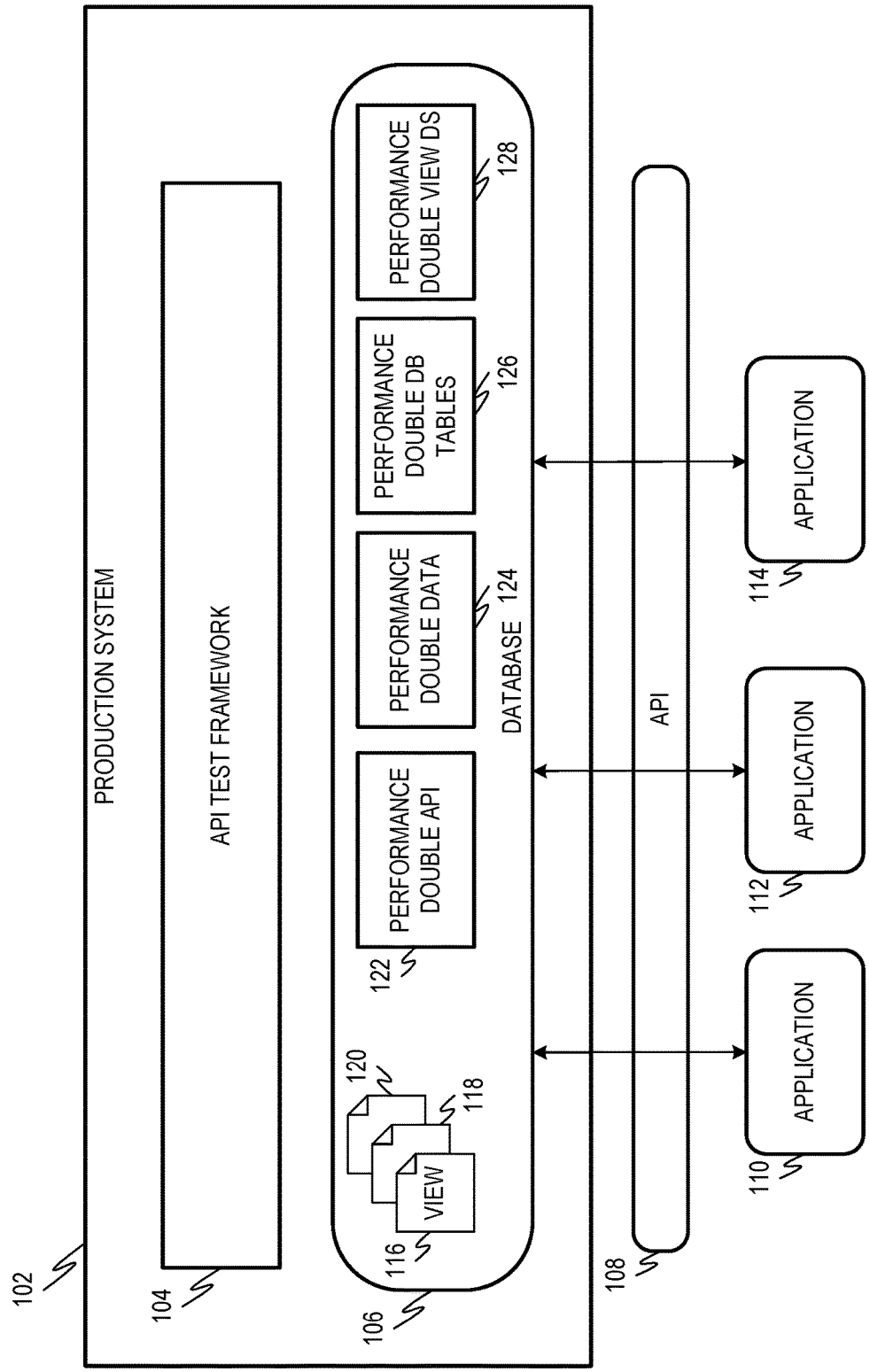
FIG. 1 is a diagram showing one example of an environment for implementing an API test framework.

In some examples, an API is used to interface between a database management system or other data source and one or more applications that consume data from the data source. The API may support a number of API calls, including read calls and write calls. API's and API calls may be formatted according to any suitable protocol, such as Hypertext Transfer Protocol (HTTP) or the OData protocol.

Read API calls, such as a GET call, may be used by an application to read data from the database management system. The application may direct a read call to the API, which may forward the read call to the database management system. The database management system may retrieve the data described by the read call and return the requested data to the API, which may return it to the requesting application. Write API calls, such as POST, PUT, and PATCH calls, may be used by an application to write data to the database management system. The application may direct a write call to the API. The write call may include payload data that is to be written to the database management system. The API forwards the write call to the database management system, including the payload data. The database management system writes the data to an appropriate location at the database management system.

In some examples, a database management system storing data to be consumed by different applications may implement a data model. The data model describes relationships between different data stored at the database and/or between data at the database and real-world elements. For example, a data model may provide a standardized way to format and describe database contents consistently across different computing software and hardware components. Implementing a data model at the database management system may provide various advantages over other solutions that may implement data models on an application-by-application basis. For example, a single database management system may serve applications running at various different application servers or other computing devices or systems. Implementing a data model at the database management system may allow the data model to be defined and consumed at the database management system rather than at the individual application servers or other computing devices or systems. This may increase standardization and simplify application development.

In some examples, a data model is implemented using view data structures. A view data structure, also called a view, is the result of a stored query to the database management system. A view data structure, in some examples, is arranged similar to a database table, however, it may not have a one-to-one correlation to any table at the database. For example, a view data structure may include records in a different arrangement than any corresponding database table and, in some examples, may include records from more than one database table. Applications may access the data at a database management system by viewing, querying to, writing to, or otherwise using the view data structures.

In some examples, a data model using view data structures can be implemented at a database management system using Core Data Services (CDS) available from SAP SE of Waldorf, Germany. CDS may be used to generate a data model between a database management system and various applications using view data structures, which may be referred to as CDS views. For example, CDS may be used to provide a data model at an SAP HANA database management system, also available from SAP SE of Waldorf, Germany.

In arrangements using a view-based data model at a database management system, an API supporting various API calls may be used to interface the database management system to the application servers or other computing devices/systems executing the applications that consume the data model. It is often desirable to test such an API or an API call against standards of performance, which may be referred to as key performance indicators (KPI). Example standards of performance for the API may include a maximum time to read a number of records from the database management system, a maximum time to write a number of records to the database management system, a memory consumption of the API, etc.

In some examples, it is challenging to test an API that operates with a database management system-implemented data model. For example, testing the API, or API calls to the API, may include reading from and/or writing to view data structures at the data model and or the database management system. Also, test data for testing the API may be written to and accessed from tables of the database management system, which may impact the performance of the system for regular functional testing. Also, in some examples, the performance of the API depends on the view data structures of the data model and/or on the underlying database tables. Changes to the data model and/or to the database may lead to changes in the performance of the API.

Because of the difficulties of testing an API in the described arrangement, that testing may occur at development time, when human and hardware resources are more plentiful. In addition to using expensive human resources, this arrangement can also lead to problems if and when the database management system and or view data structures of the data model change after development. For example, the API and its various API calls may be compliant with standards of performance during development and at product release. During post-release maintenance, however, bug fixes and/or other changes may lead to degradation in the performance of the API in general or various API calls in particular. In some cases, the resulting degradation may cause the performance of the API and/or of one or more of its API calls to fall out of the range of the KPI standards of performance.

These and other issues may be addressed utilizing an API test framework, as described herein. The API test framework may operate automatically rather than manually and may be configured to operate while the API is deployed in a production environment. For example, when testing read API calls that involve reading from the database management system, the API test framework may be configured to generate performance doubles for at least one table at the database management system and/or for at least one view data structure. The performance doubles may be stored, for example, at a cold storage at the database management system. When the read API call is to be tested, the API test framework may load the performance doubles to hot storage and measure the performance of the API call against one or more standards of performance. If the API call fails to meet one or more standards of performance, the API may be modified and/or corrected.

FIG. 1 is a diagram showing one example of an environment 100 for implementing an API test framework 104. The environment 100 comprises a production system 102, an API 108, and various applications 110, 112, 114. The production system 102 may host the API test framework 104 and a database management system 106. The production system 102 may be or include any suitable computing device or systems. In some examples, the production system 102 is or includes a cloud deployment. For example, the production system 102 may be executed by one or more server computing devices at a common geographic location and/or distributed across multiple geographic locations. In other examples, the production system 102 is implemented in an on-premise arrangement including one or more server computing systems that execute the components of the production system. For example, in an on-premise arrangement, the production system 102 may include one or more server computing devices built and/or maintained by an entity associated with the users of the various applications 110, 112, 114. Also, although the production system 102 is executes both the database management system 106 and the API test framework 104, in some examples, the API test framework 104 may be executed at a different systems.

The API 108 may be executed at one or more computing devices. In some examples, the API 108 is executed at the production system 102 and/or may be executed at one or more computing systems or devices remote from the computing systems or devices executing the production system 102. The API 108 supports one or more API calls that can be made by the applications 110, 112, 114 to interface with the production system 102, including the database management system 106.

The applications 110, 112, 114 may execute at any suitable system. For example, the applications 110, 112, 114, may execute at one or more user devices associated with users of the applications 110, 112, 114. In other examples, the applications 110, 112, 114 may execute at one or more application servers, which may be part of an on-premise and/or cloud implementation. The applications 110, 112, 114, the API 108 and the production system 102 may communicate using any suitable type of local or wide area network.

The database management system 106 may include various view data structures 116, 118, 120. The view data structures 116, 118, 120 may implement a data model and may be based on one or more database tables (not shown) that may also be stored at the database management system 106. The API test framework 104 may be configured to conduct performance testing of the API 108, for example, in an automated manner, as described herein.

The API test framework 104 may test the API 108 by measuring it against one or more standards of performance, such as the KPIs described herein. In some examples, the API test framework 104 tests the API 108 by testing individual API calls. The API test framework 104, for example, may test all of the API calls supported by the API 108 in one operation and/or may test a subset of one or more of the API calls supported by the API 108.

Consider an example read API call. An example standard of performance may indicate that the API 108 should respond to the read API call by reading X records from the database management system 106 in less than Y seconds. Measuring the API 108 against this example standard of performance may include executing the read API call and measuring the time that it takes the API 108 to read X from the database management system 106 and comparing the time to Y seconds. If the time to read X records is less than Y seconds, then the read API call meets the standard of performance. If the time to read X is not less than Y seconds, then the read API call does not meet the standard of performance.

In some examples, the API test framework 104 generates performance double objects such as, for example, performance double tables 126, performance double data 124, performance double view data structures 128, and/or performance double APIs 122. Collectively, these are referred to herein as performance double artifacts 122, 124, 126, 128. It will be appreciated that some examples may generate and/or use less than all of the performance double artifacts 122, 124, 126, 128 shown in FIG. 1. Also, it will be appreciated that some examples may generate and/or use additional performance double artifacts not shown in FIG. 1.

The performance double artifacts 122, 124, 126, 128 may be used, as described herein, to measure the API 108, or various API calls supported by the API 108, against one or more standards of performance.

Performance double database tables 126 may include tables and/or other database data structures that are copies of corresponding tables and/or other database data structures from the database management system 106. The performance double database tables 126 may be used during testing of the API 108 and/or API calls thereof, for example, to decouple the view data structures 116, 118, 120 from the underlying database tables. This may facilitate testing of the API 108 and/or an API call thereof in a production environment while minimizing effects on the database management system 106.

The API test framework 104 may also generate performance double data 124, as described herein. The performance double data 124, in some examples, is used in the measuring of the API 108, or an API call thereof, against the one or more standards of performance. The performance double data 124, in some examples, is generated at least in part by sampling data at the database management system 106, for example, to generate performance double data 124 that is similar to the data stored at the database.

The API test framework 104 may also generate performance double view data structures 128. The performance double view data structures 128 may be copies of one or more of the view data structures 116, 118, 120 used to implement the data model at the database management system 106.

In some examples, the API test framework 104 also generates a performance double API 122. The performance double API 122 may be a copy of the API 108 and/or of one or more API calls thereof. For example, the API test framework 104 may test the API 108 by applying the performance double API 122 to the performance double data 124 and/or the performance double database tables 126, as described herein.

Figure 2:
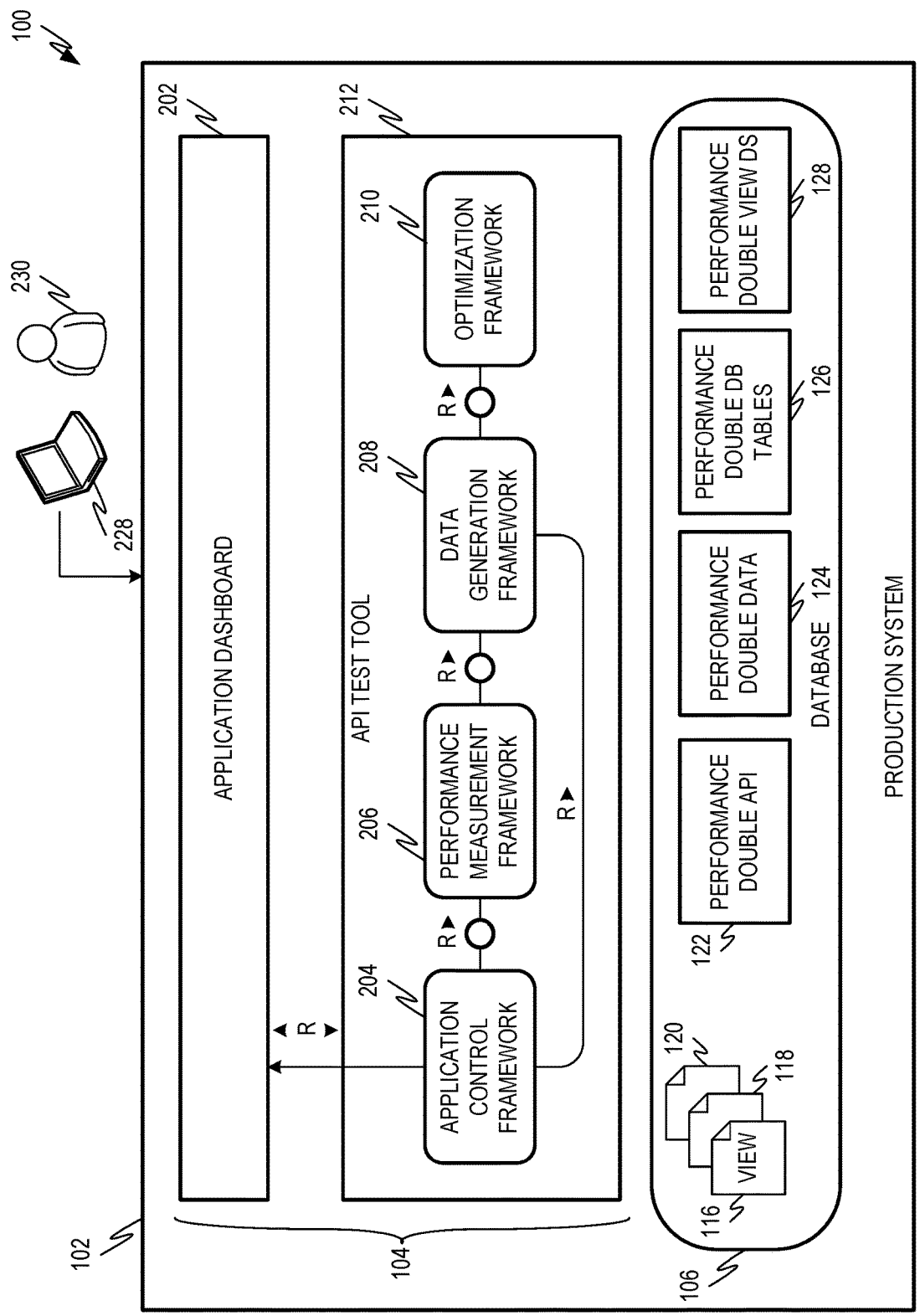
FIG. 2 is a diagram showing one example of the environment of FIG. 1 including additional features.

FIG. 2 is a diagram showing one example of the environment 100 of FIG. 1 including additional features. In the example of FIG. 2, the API test framework 104 comprises an application dashboard 202 and an API test tool 212. The API test tool 212 comprises an application control framework 204, a performance measurement framework 206, a data generation framework 208, and an optimization framework 210.

The application dashboard 202 is in communication with at least one administrative user 230 via a user computing device 228. The application dashboard 202 may be configured to provide the user 230 with functionality to select APIs, API calls, and artifacts for testing and/or to set KPIs or other standards of performance for the API 108 and/or various API calls thereof. In some examples, the application dashboard 202 may also provide the user 230 with functionality to view and/or modify the way that the API test framework 104 generates performance double artifacts 122, 124, 126, 128. The application dashboard 202 may also, in some examples, provide the user 230 with functionality to prompt a test of the API 108, or API calls thereof, and/or schedule the frequency of tests of the API 108, or API calls thereof. The application dashboard 202 may also provide results of API testing to the user 230.

In some examples, the application dashboard 202 may provide various other functionality to the user 230. For example, the application dashboard 202 may be programmed to provide the user 230 with recommended standards of performance for the API 108 or for API calls thereof. The recommended standards of performance may be based on various factors such as, for example, historical data describing standards of performance used for various other APIs or API calls, the type of API or API call being tested, performance guidelines provided by the user 230 or otherwise available to the application dashboard, etc. In some examples, the application dashboard 202 generates the recommended standards of performance using a regression algorithm or other suitable computer model.

The application control framework 204, performance measurement framework 206, data generation framework 208, and optimization framework 210 may be components of the API test framework 104. The frameworks 204, 206, 208, 210 may be or include, for example, one or more executables and/or other functional software units.

The data generation framework 206, as described herein, may generate performance double artifacts 122, 124, 126, 128. The data generation framework 206 may generate the performance double artifacts 122, 124, 126, 128, for example, based on the API 108 under test and using the data stored at the database management system 106 and/or view data structures 116, 118, 120, as described herein.

The optimization framework 210 may be used by the data generation framework 208 for generating artifacts, such as the performance double artifacts 122, 124, 126, 128. The optimization framework 210, in some examples, executes machine learning based algorithms that may be called by the data generation framework 206 to generate performance double artifacts 122, 124, 126, 128.

The performance measurement framework 206 may measure the API 108 against one or more standards of performance. For example, the performance measurement framework 206 may access one or more of the performance double artifacts 122, 124, 126, 128 from a cold storage area of the database management system 106 and calculate performance measures for the API 108 or API call.

The application control framework 204 may manage data flow to the other frameworks 206, 208, 210. For example, when a performance measurement of the API 108, or an API call thereof, is to occur, the application control framework 204 may prompt the data generation framework 208 to generate one or more performance double artifacts 122, 124, 126, 128. The application control framework 204 may also prompt the performance measurement framework 206 to retrieve the performance double artifacts 122, 124, 126, 128 from cold storage and begin measuring the API 108 or API call against the one or more standards of performance.

Figure 3:
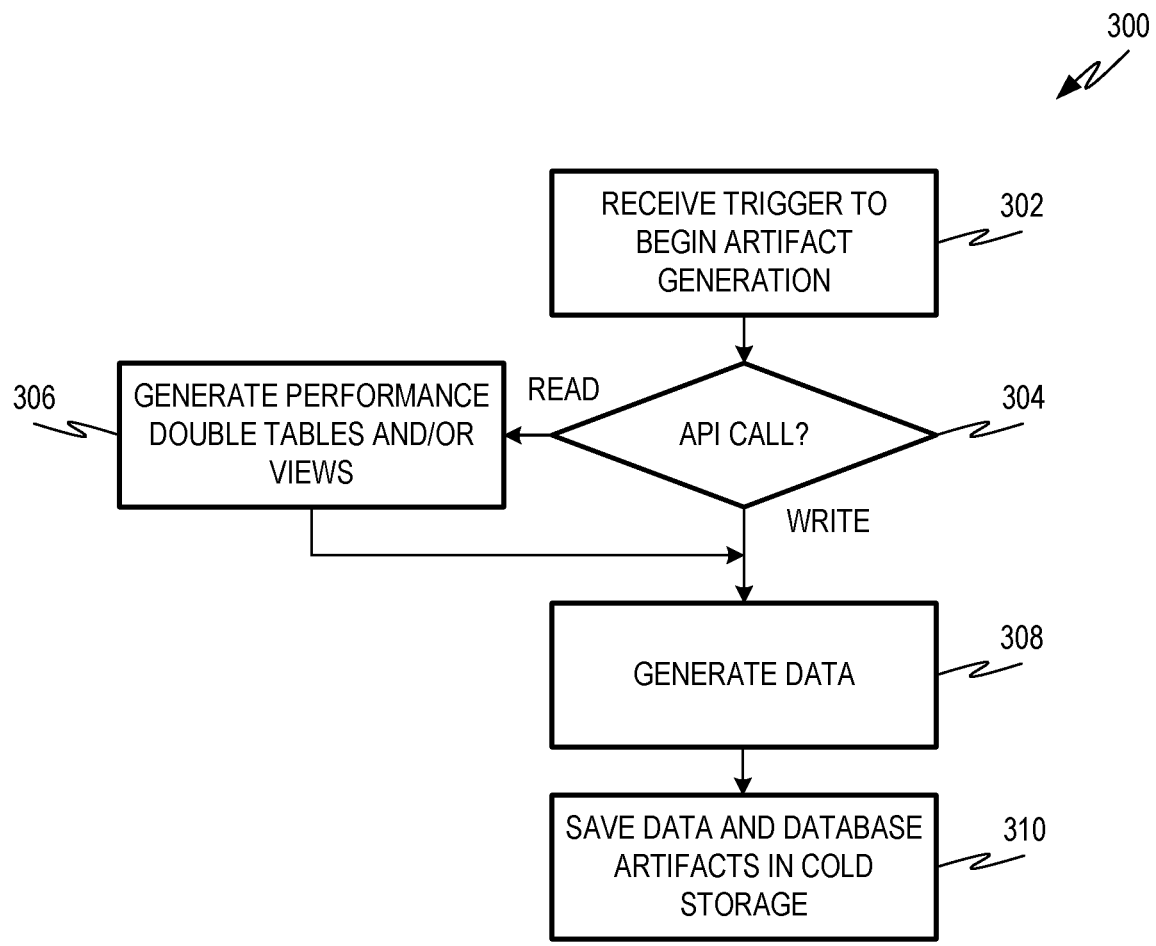
FIG. 3 is a flowchart showing one example of a process flow that may be executed, for example, by the data generation framework, to generate performance double artifacts.

FIG. 3 is a flowchart showing one example of a process flow 300 that may be executed, for example, by the data generation framework 208, to generate performance double artifacts 122, 124, 126, 128. At operation 302, the data generation framework 208 may receive a trigger to begin generating performance double artifacts 122, 124, 126, 128 for an API call to be tested, referred to herein as the API call under test. The API call under test may be, for example, a call supported by the API 108 and may be, for example, a read or a write call.

The trigger may be a message received from another component, such as from the application control framework 204. In some examples, the application control framework 204 may trigger the data generation framework 208 to begin artifact generation when a new API or a new API call is indicated at the application dashboard 202 (e.g., by the user 230). In another example, the user 230 may provide, via the application dashboard 202, a manual trigger to prompt artifact generation for the API 108 or an API call thereof. The application dashboard 202 may provide the manual trigger to the data generation framework 208 via the application control framework 204.

In some examples the trigger received by the data generation framework 208 at operation 302 is generated automatically upon the occurrence of various other events. For example, the application control framework 204 or other suitable component may trigger the data generation framework 208 upon receiving an indication that a standard of performance for the API 108 has changed. In another example, the application control framework 204 or other suitable component may trigger the data generation framework 208 upon receiving an indication that one or more of the view data structures 116, 118, 120 of the data model implemented at the database management system 106 has changed. In another example the application control framework 204 or other suitable component may trigger the data generation framework 208 upon receiving an indication that there has been a change in one or more tables at the database management system 106.

At operation 304 the data generation framework 208 determines whether the API call under test is a read call or a write call. If the API call under test is a read call, the data generation framework 208 may generate performance double tables and or views at operation 306. For example, the data generation framework 208 may generate performance doubles of one or more tables at the database management system 106 that would be accessed in order to respond to the read API call under test. In some examples, the data generation framework 208 utilizes the view data structures 116, 118, 120 to determine which tables at the database management system 106 would be accessed in order to respond to the read API call under test. In some examples, the data generation framework 208 also generates performance doubles for one or more of the view data structures 116, 118, 120 as well. Additional details and examples describing how the data generation framework 208 may generate performance double database tables 126 and/or performance double view data structures 128 are described herein with respect to FIG. 4.

If the API call under test is a write call at operation 304, or in addition to generating performance double tables and or views at operation 306, the data generation framework may generate performance double data 124 at operation 308. Additional examples for generating performance double data 124 in the case where the API call under test is a read call are provided herein with respect to FIG. 5. Additional examples for generating performance double data 124 in the case where the API call under test is a write call are provided herein with respect to FIG. 5.

At operation 310, the data generation framework 208 saves the performance double artifacts generated at operation 306 and or at operation 308. The data generation framework 208 may save the performance double artifacts to a cold storage location at the database management system 106. The cold storage location is a location at the database management system 106 which may not be optimized for read or write speed. Hot storage space at the database management system 106 may be or include storage locations at the database management system 106 that support faster read and/or write times than the cold storage locations. By storing the performance double artifacts at the cold storage location, the data generation framework 208 may not take up more valuable hot storage space at the database management system 106.

Figure 4:
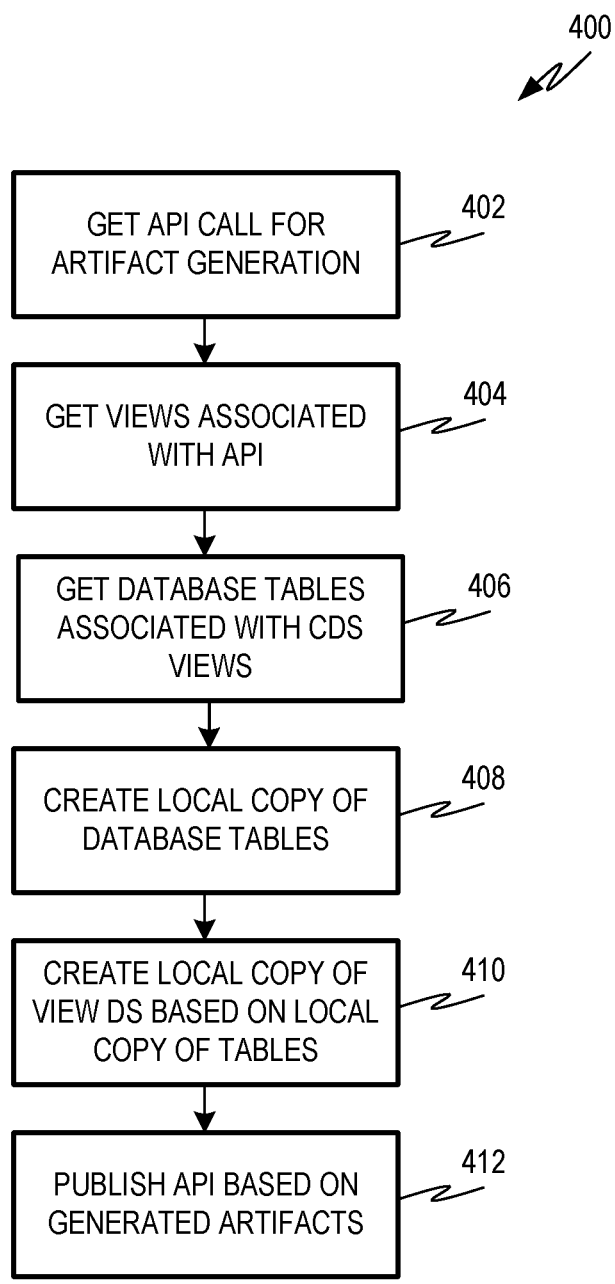
FIG. 4 is a flowchart showing one example of a process flow that may be executed by the API test tool to generate performance double tables and/or performance double views.

FIG. 4 is a flowchart showing one example of a process flow 400 that may be executed by the API test tool 212 (e.g., the data generation framework 208 thereof) to generate performance double tables 126 and/or performance double view data structures 128. For example, the process flow 400 shows one example way that the data generation framework 208 may execute the operation 306 of the process flow 300.

At operation 402, the data generation framework 208 accesses the API call under test. For example, the data generation framework 208 may have received an indication of the API call under test when it was triggered to begin generating performance double artifacts. In another example, the data generation framework 208 may query the application control framework 204 or other suitable component of the API test framework 104 to receive the API call under test or an indication thereof.

At operation 404, the data generation framework 208 accesses view data structures 116, 118, 120 associated with the API call under test. This may include, for example, examining the API call under test and determining which view data structure or structures 116, 118, 120 are to be accessed in order to respond to the API call under test. The data generation framework 208 may determine which view data structure or structures 116, 118, 120 are associated with the API call under test in any suitable manner. For example, the data generation framework 208 may execute the API call under test to determine which of the view data structures 116, 118, 120 are read to respond.

At operation 406, the data generation framework 208 accesses database tables associated with the view data structure or structures 116, 118, 120 identified at operation 404. In some examples, the data generation framework 208 may use the view data structures 116, 118, 120 identified at operation 404 to identify the corresponding database tables. For example, the view data structures 116, 118, 120 may be associated with a query to be executed against the various tables of the database management system 106. The data generation framework 208 may access the query or queries associated with view data structures 116, 118, 120 identified at operation 404 to determine which tables are referenced by those view data structures 116, 118, 120. At operation 408, the data generation framework 208 generates copies of the database tables identified at operation 406. The generated copies of the database tables may be performance double database tables 126. At operation 410, the data generation framework 208 creates copies of the view data structures 116, 118, 120 identified at operation 404. The generated copies of view data structures 116, 118, 120 may be performance double view data structures 128.

At operation 412, the data generation framework 208 publishes the performance double API call 122 based on the artifacts generated at operations 408 and 410. For example, the performance double API call 122 may be similar to the API call under test but may reference the performance double database tables 126 generated at operation 406 instead of the tables at the database management system 106 and may reference the performance double view data structures 128 generated at operation 410 instead of the view data structures 116, 118, 120 that are used in the production system 102.

Figure 5:
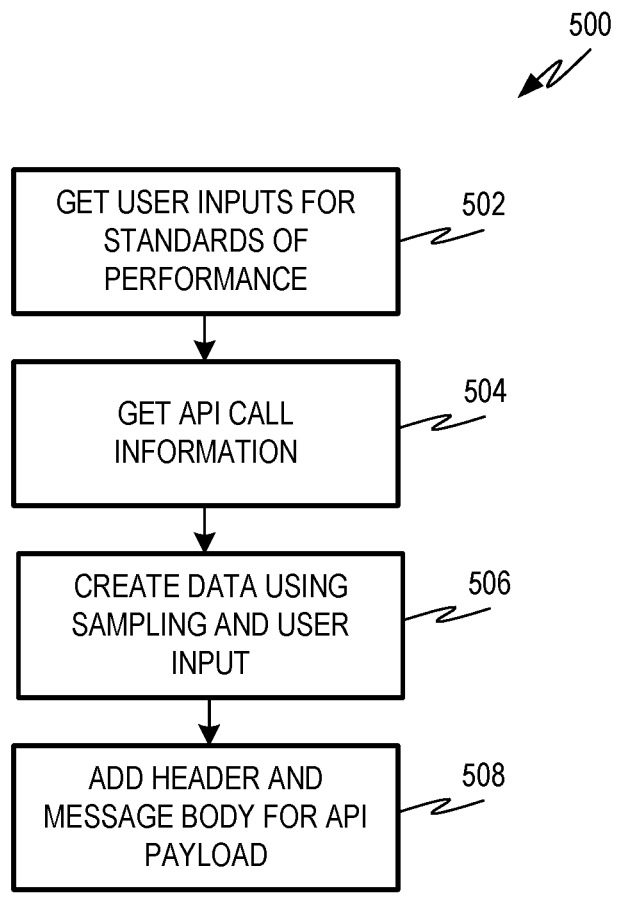
FIG. 5 is a flowchart showing one example of a process flow that may be executed by the API test framework to generate performance double data when the API call under test is a write call.

FIG. 5 is a flowchart showing one example of a process flow 500 that may be executed by the API test framework 104 to generate performance double data 124 when the API call under test is a write call. For example, the process flow 500 shows one example way that the data generation framework 208 can perform the operation 308 of FIG. 3 when the API call under test is a write call.

At operation 502, the data generation framework 208 may access user inputs indicating standards of performance that are to be applied to the API call under test. For example, the standards of performance may have been provided by the user 230 via the application dashboard 202. In other examples, the standards of performance may have been automatically generated by the application dashboard 202, the application control framework 204, or another suitable component. Also, as described here, the application dashboard 202 may have generated recommended standards of performance that were subsequently accepted by the user 230.

At operation 504, the data generation framework 208 accesses information about the API call under test. The information may include, for example, fields of the underlying database tables that are exposed to be written to in response to the right API call under test. The information may also include payload requirements associated with the exposed fields. To determine the exposed fields, the data generation framework 208 may access the view data structures 116, 118, 120 and or the performance double view data structures 128. The various view data structures may indicate the underlying database tables that are written to in response to the API call under test.

At operation 506, the data generation framework 208 creates data for the exposed fields identified at 504. The data generation framework 208 may generate the data based on, for example, user input and/or sampling. The data generation framework 208 and/or the optimization framework 210 may sample the underlying database tables at the database management system 106. The types of fields in the underlying database tables may be noted as well as domain values at the tables. Data may be sampled from the tables according to any suitable technique. In some examples, the data generation framework 208 may sample records and or fields from the indicated tables at an interval. For example, if the interval is equal to N, then the data generation framework may sample the record at a first position at the table, skip N records and then sample the next record. The interval N may be constant and/or may increase or decrease as different records are sampled. In another example, various records at the database table or tables are described by a Global Universal Identifier (GUID), such as a 16-character GUID. The data generation framework 208 may sample records by generating a random or pseudorandom GUID value and then sampling the record, if any, having the randomly generated GUID value.

In some examples, data generation, at operation 506, may include using the optimization framework 210. For example, optimization framework 210 may execute a machine learning algorithm to select data from the database management system to be sampled and/or to convert the sample data into performance double data 124. In some examples the machine learning algorithm may have been trained using the results of previous API call under test evaluations. In this way the machine learning algorithm may be tuned to select samples from the database management system and or convert samples into performance double data 124 in such a way as to increase the effectiveness of the testing.

At operation 508, the data generation framework adds a header and message body for the API call payload. The message body may include data to be written to the database table in response to the write API call and may be based on the data sampled at operation 506. The header may indicate the database table at the database management system 106 where the message body and payload data is to be written.

Figure 6:
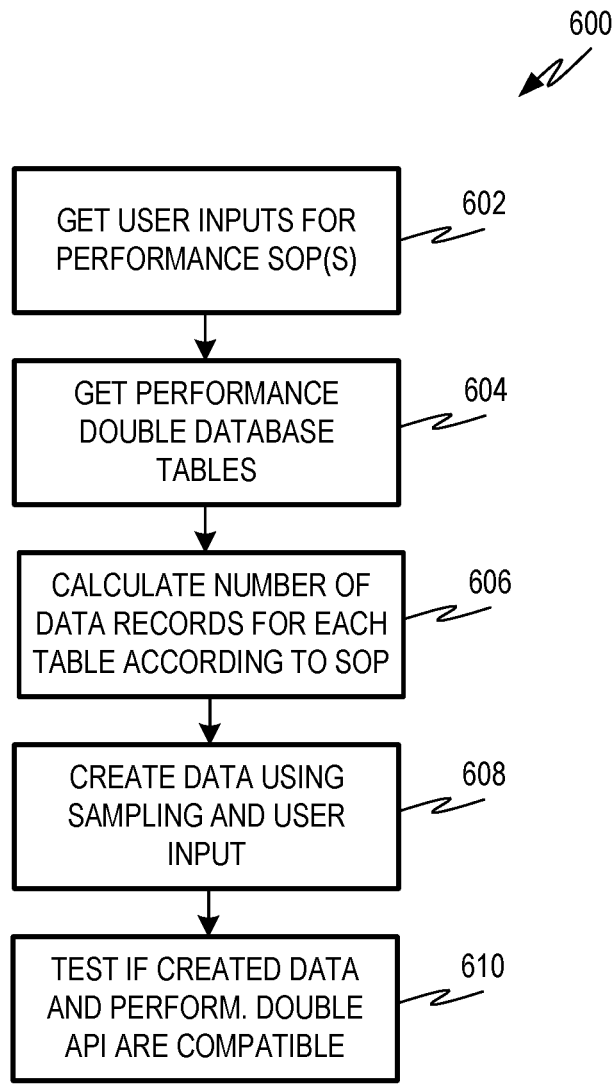
FIG. 6 is a flowchart showing one example of a process flow that may be executed by the API test framework to generate performance double data when the API call under test is a read call.

FIG. 6 is a flowchart showing one example of a process flow 600 that may be executed by the API test framework 104 to generate performance double data 124 when the API call under test is a read call. For example, the process flow 600 shows one example way that the data generation framework 208 can perform the operation 308 of FIG. 3 when the API call under test is a read call.

At operation 602, the data generation framework 208 may access user inputs indicating standards of performance that are to be applied to the API call under test. For example, the standards of performance may have been provided by the user 230 via the application dashboard 202. In other examples, the standards of performance may have been automatically generated by the application dashboard 202, the application control framework 204, or another suitable component. Also, as described here, the application dashboard 202 may have generated recommended standards of performance that were subsequently accepted by the user 230.

At operation 604, the data generation framework 208 may access performance double database tables 126, for example, as generated at operation 306 of the process flow 300. At operation 606, the data generation framework 208 may calculate the number of data records for each of the retrieved tables according to the standards of performance determined at operation 602. For example, the data generation framework 208 made determine the number of data records that would need to be read in a given amount of time in order to meet the standards of performance with which the API call under test is to be measured. This may include, for example, considering a relationship between data fields in the database table and corresponding data fields in the API call. It may also include considering a relationship between different database tables according to the relevant view data structure 116, 118, 120 and or the performance double view data structure 128. The relationship between different database tables according to the relevant view data structure 116, 118, 120 may be based on the data types of the field, association and/or join conditions in view data structures, where clauses in the view data structures and/or the underlying database tables that the view data structures rely on.

At operation 608, the data generation framework may create data, for example, using sampling and or user input. The data may be generated in a manner similar to that described herein with respect to operation 506. In some examples, the performance double data 124 may be generated utilizing a machine learning algorithm implemented by the optimization framework 210. For example, the machine learning algorithm may receive as input various parameters about the API call under test such as, for example, parameters describing the underlying database tables, parameters describing the field types of the underlying database tables, and parameters describing field values of the underlying database table, as well as details regarding the view data structures 116, 118, 120 including for example the join and association relationships between different database tables according to the view data structures.

At operation 610, the data generation framework 208 may test to determine if the created data and the performance double API are compatible. For example, the read API call under test may be accompanied by one or more filter criteria. The filter criteria may determine which view data structures 116, 118, 120 and/or underlying database tables are to be accessed by the read API call. Testing for compatibility between the created data and the performance double API 122 may include, for example, running the example API call using the generated performance double data 124.

Figure 7:
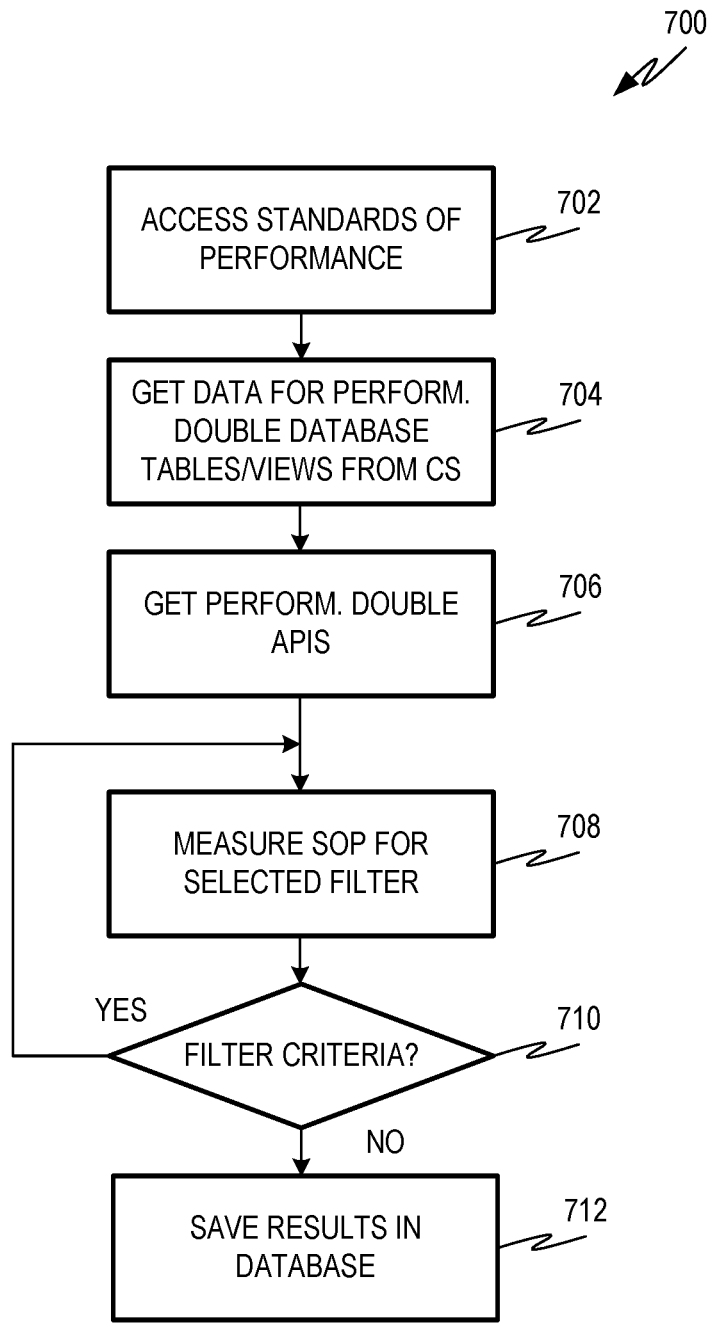
FIG. 7 is a flowchart showing one example of a process flow that may be executed by the API testing framework to test a read API call against at least one standard of performance.

FIG. 7 is a flowchart showing one example of a process flow 700 that may be executed by the API test framework 104 (e.g., the performance measurement framework) to test a read API call against at least one standard of performance.

At operation 702, the API test framework 104 may access standards of performance for an API call under test. The standards of performance may be determined, for example, using input from the user 230 and/or recommendations generated by and/or for the application dashboard 202, as described herein. At operation 704, the performance measurement framework 206 may access performance double database tables and or views from the cold storage. The performance measurement framework 206 may load performance double database tables 126 and/or performance double view data structures 128 from the cold storage at the database management system 106 into hot storage at the database management system 106. At the hot storage, the performance double database tables 126 and the performance double view data structures 128 may be quickly accessible for performing the test on the API call under test.

At operation 706, the performance measurement framework 206 may access performance double API 122. For example, the performance measurement framework 206 may access a portion of the performance double API 122 corresponding to the API call under test. At operation 708, the performance measurement framework 206 may measure the API call under test against at least one standard of performance for a first criterion. The filter criterion may be a Boolean condition describing data that is requested through the read API call under test. Measuring the API call under test against a standard of performance for a filter criterion may include executing the API call under test against the performance double database tables 126 and or performance double view data structures 128 in the performance double API 122 using the considered criterion. The result may be compared to the standard of performance to determine if the standard of performance is met for the tested criterion. For example, if the standard of performance indicates that a threshold number of records should be returned via the API call under test in a threshold amount of time, the performance measurement framework 206 may determine whether the API call under test meets the standard of performance by determining if the threshold number of records was returned in the threshold time using the tested criteria.

At operation 710, the performance measurement framework 206 may determine if there are any additional filter criteria associated with the API call under test. If there are any additional filter criteria associated with the API call under test, then the performance measurement framework 206 may return to operation 708 and measure the API under test with the next filter criterion. When all filter criteria have been tested, the performance measurement framework 206 may save results of the test to the database management system 106, at operation 712. In some examples, the performance measurement framework 206 may also report results of the test to the application control framework 206 and/or application dashboard 202, where the results may be displayed to the user 230.

Figure 8:
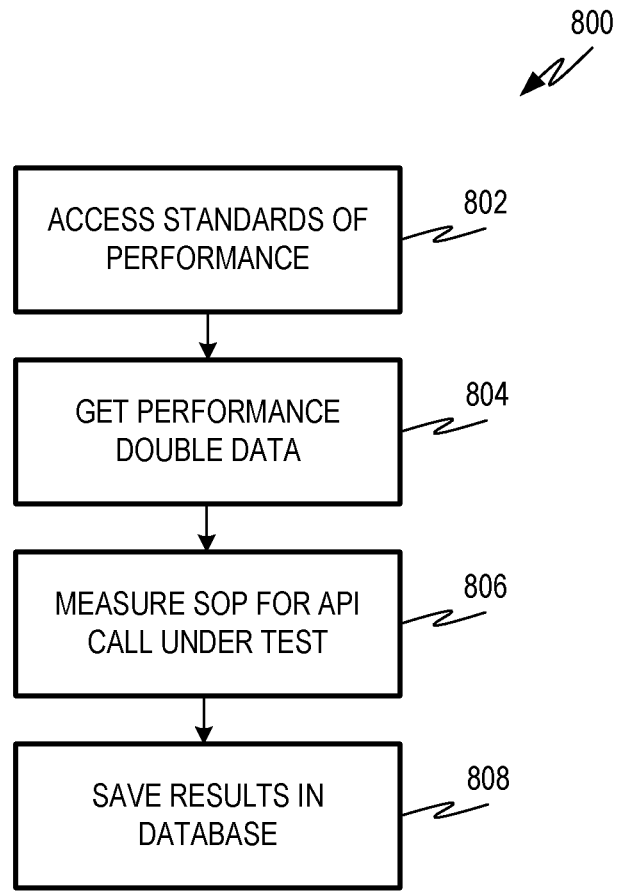
FIG. 8 is a flowchart showing one example of a process flow that may be executed by the API testing framework to test a write API call against at least one standard of performance.

FIG. 8 is a flowchart showing one example of a process flow 800 that may be executed by the API test framework 104 (e.g., the performance measurement framework) to test a write API call against at least one standard of performance. At operation 802, the API test framework 104 may access standards of performance for an API call under test. The standards of performance may be determined, for example, using input from the user 230 and/or recommendations generated by and/or for the application dashboard 202, as described herein. At operation 804, the performance measurement framework 206 may access performance double data generated, for example, as described herein with respect to the process flow 600 of FIG. 6. The performance measurement framework 206 may load performance double data 124 from the cold storage at the database management system 106 into hot storage at the database management system 106. At the hot storage, the performance double data 124 may be quickly accessible for performing the test on the API call under test.

At operation 806, the performance measurement framework 206 may measure the API call under test against at least one standard of performance. At operation 808, the performance measurement framework 206 may save results to the database management system 106. In some examples, the performance measurement framework 206 may also report results of the test to the application control framework 206 and/or application dashboard 202, where the results may be displayed to the user 230.

Figure 9:
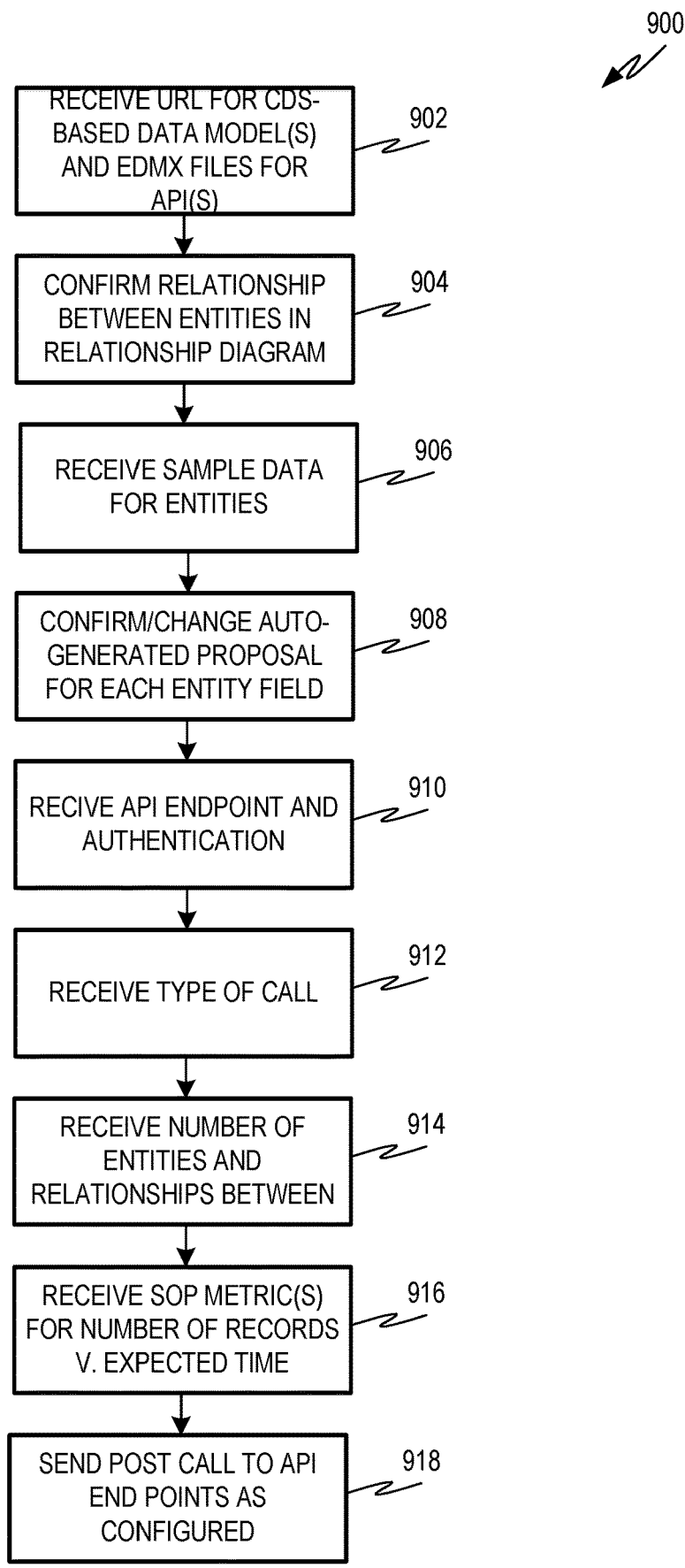
FIG. 9 is a flowchart showing one example of a process flow that may be executed in the environment to configure and test APIs and API calls as described herein.

FIG. 9 is a flowchart showing one example of a process flow 900 that may be executed in the environment 100 to configure and test APIs and API calls as described herein. The process flow 900 may describe the actions of the user 230 via the application dashboard 202.

At operation 902, the application dashboard 202 may receive a universal resource locator (URL) indicating the data model at the database management system indicated by the view data structures 116, 118, 120. The application dashboard 202 may use the URL to access the view data structures 116, 118, 120 at the database management system 106 and display a representation of all or part of the data model indicated by the view data structures 116, 118, 120 to the user 230 via the user computing device 228. At operation 904, the user 230 may confirm the relationships between data entries indicated by the various view data structures 116, 118, 120.

At optional operation 906, the user 230 may enter or upload, via the application dashboard 202, sample data for the entities represented by the data model. The sample data may include, for example, data that is likely to be stored in the database management system 106 and described by the data model. Based on the sample data uploaded and or data stored at the database management system and described by the data model, the API test framework 104 may automatically generate proposed data to be entered at various entity fields in the data model. At operation 908, the application dashboard 202 may receive from the user 230 a confirmation of the auto generated proposals for the respective entity fields. In some examples, the user 230 will change some or all of the auto generated proposals at the various entity fields.

At operation 910, the application dashboard 202 may receive an indication of an API end point and authentication to the API 108. For example, this may allow the API test framework 104 to access the API 108. At operation 912, the application dashboard 202 may receive from the user 230 an indication of an API call under test. At operation 914, the application dashboard 202 may receive from the user 230 a number of entities to be tested with the API call under test and, in some examples, one or more relationships between the indicated entities. At operation 916, the dashboard 202 may receive standards of performance metrics such as, for example, a number of records versus an expected time in which that number of records should be processed via the API 108. At operation 918, the application dashboard 202 may send a post call to the API 108 endpoints as configured to verify the connection.

In view of the disclosure above, various examples are set forth below. It should be noted that one or more features of an example, taken in isolation or combination, should be considered within the disclosure of this application.

EXAMPLES

Example 1 is a system for evaluating an Application Program Interface (API) for interfacing an application to a database through a data model, the system comprising: at least one processor programmed to perform operations comprising: accessing an indication of a first API call to the API, the first API call being a read operation call; accessing a first view data structure associated with the first API call, the data model being described by a plurality of view data structures based on one or more tables at a database, the plurality of view data structures comprising the first view data structure; using the first view data structure to select a first table from the one or more tables, the first table being associated with the first API call; generating a first performance double table corresponding to the first table; generating a first performance double view data structure corresponding to the first view data structure, the first performance double view data structure being based on the first performance double table; and measuring the API against a standard of performance for the API, the measuring using the first performance double view data structure and the first performance double table.

In Example 2, the subject matter of Example 1 optionally includes the operations further comprising: receiving an indication that the standard of performance for the API has changed; and prompting the measuring of the API against the standard of performance for the API in response to receiving the indication that the standard of performance for the API has changed.

In Example 3, the subject matter of any one or more of Examples 1-2 optionally includes the operations further comprising: receiving an indication that the first view data structure has changed; generating a second performance view data structure corresponding to the first view data structure; and prompting the measuring of the API against the standard of performance for the API in response to receiving the indication that the first view data structure has changed.

In Example 4, the subject matter of any one or more of Examples 1-3 optionally includes the operations further comprising: receiving an indication that the first table has changed; generating a second performance double table corresponding to the first table; and prompting the measuring of the API against the standard of performance for the API in response to receiving the indication that the first table has changed.

In Example 5, the subject matter of any one or more of Examples 1-4 optionally includes the operations further comprising generating a performance double API using the first performance double table and the first performance double view data structure, the measuring of the API against the standard of performance comprising measuring the performance double API against the standard of performance.

In Example 6, the subject matter of any one or more of Examples 1-5 optionally includes the measuring of the API against the standard of performance for the API comprises: accessing the first performance double table from a cold storage location; accessing the first performance double view data structure from the cold storage location; accessing a performance double API from the cold storage location; determining a response of the performance double API using the first performance double table and the first performance double view data structure; and comparing the response of the performance double API and the standard for performance for the API.

In Example 7, the subject matter of any one or more of Examples 1-6 optionally includes the operations further comprising: accessing the first performance double table; using the standard of performance for the API to determine a number of data records for the first table; and generating first performance double data for the first table, the first performance double data having the number of data records, the measuring of the API against the standard of performance also using the first performance double data.

In Example 8, the subject matter of any one or more of Examples 1-7 optionally includes the operations further comprising: accessing an indication of a second API call to the API, the second API call being a write operation call; accessing sample data from the database; generating second performance double data, the second performance double data being based at least in part on the sample data; and measuring the API against a second standard of performance for the API, the measuring using the second performance double data.

Example 9 is a method for evaluating an Application Program Interface (API) for interfacing an application to a database through a data model, the method comprising: accessing an indication of a first API call to the API, the first API call being a read operation call; accessing a first view data structure associated with the first API call, the data model being described by a plurality of view data structures based on one or more tables at a database, the plurality of view data structures comprising the first view data structure; using the first view data structure to select a first table from the one or more tables, the first table being associated with the first API call; generating a first performance double table corresponding to the first table; generating a first performance double view data structure corresponding to the first view data structure, the first performance double view data structure being based on the first performance double table; and measuring the API against a standard of performance for the API, the measuring using the first performance double view data structure and the first performance double table.

In Example 10, the subject matter of Example 9 optionally includes receiving an indication that the standard of performance for the API has changed; and prompting the measuring of the API against the standard of performance for the API in response to receiving the indication that the standard of performance for the API has changed.

In Example 11, the subject matter of any one or more of Examples 9-10 optionally includes receiving an indication that the first view data structure has changed; generating a second performance view data structure corresponding to the first view data structure; and prompting the measuring of the API against the standard of performance for the API in response to receiving the indication that the first view data structure has changed.

In Example 12, the subject matter of any one or more of Examples 9-11 optionally includes receiving an indication that the first table has changed; generating a second performance double table corresponding to the first table; and prompting the measuring of the API against the standard of performance for the API in response to receiving the indication that the first table has changed.

In Example 13, the subject matter of any one or more of Examples 9-12 optionally includes generating a performance double API using the first performance double table and the first performance double view data structure, the measuring of the API against the standard of performance comprising measuring the performance double API against the standard of performance.

In Example 14, the subject matter of any one or more of Examples 9-13 optionally includes the measuring of the API against the standard of performance for the API comprises: accessing the first performance double table from a cold storage location; accessing the first performance double view data structure from the cold storage location; accessing a performance double API from the cold storage location; determining a response of the performance double API using the first performance double table and the first performance double view data structure; and comparing the response of the performance double API and the standard for performance for the API.

In Example 15, the subject matter of any one or more of Examples 9-14 optionally includes accessing the first performance double table; using the standard of performance for the API to determine a number of data records for the first table; and generating first performance double data for the first table, the first performance double data having the number of data records, the measuring of the API against the standard of performance also using the first performance double data.

In Example 16, the subject matter of any one or more of Examples 9-15 optionally includes accessing an indication of a second API call to the API, the second API call being a write operation call; accessing sample data from the database; generating second performance double data, the second performance double data being based at least in part on the sample data; and measuring the API against a second standard of performance for the API, the measuring using the second performance double data.

Example 17 is a non-transitory machine-readable medium having instructions thereon that, when executed by at least one processor, cause the at least one processor to perform operations comprising: accessing an indication of a first API call to an API, the first API call being a read operation call, the API being for interfacing an application to a database through a data model; accessing a first view data structure associated with the first API call, the data model being described by a plurality of view data structures based on one or more tables at a database, the plurality of view data structures comprising the first view data structure; using the first view data structure to select a first table from the one or more tables, the first table being associated with the first API call; generating a first performance double table corresponding to the first table; generating a first performance double view data structure corresponding to the first view data structure, the first performance double view data structure being based on the first performance double table; and measuring the API against a standard of performance for the API, the measuring using the first performance double view data structure and the first performance double table.

In Example 18, the subject matter of Example 17 optionally includes receiving an indication that the standard of performance for the API has changed; and prompting the measuring of the API against the standard of performance for the API in response to receiving the indication that the standard of performance for the API has changed.

In Example 19, the subject matter of any one or more of Examples 17-18 optionally includes receiving an indication that the first view data structure has changed; generating a second performance view data structure corresponding to the first view data structure; and prompting the measuring of the API against the standard of performance for the API in response to receiving the indication that the first view data structure has changed.

In Example 20, the subject matter of any one or more of Examples 17-19 optionally includes receiving an indication that the first table has changed; generating a second performance double table corresponding to the first table; and prompting the measuring of the API against the standard of performance for the API in response to receiving the indication that the first table has changed.

Figure 10:
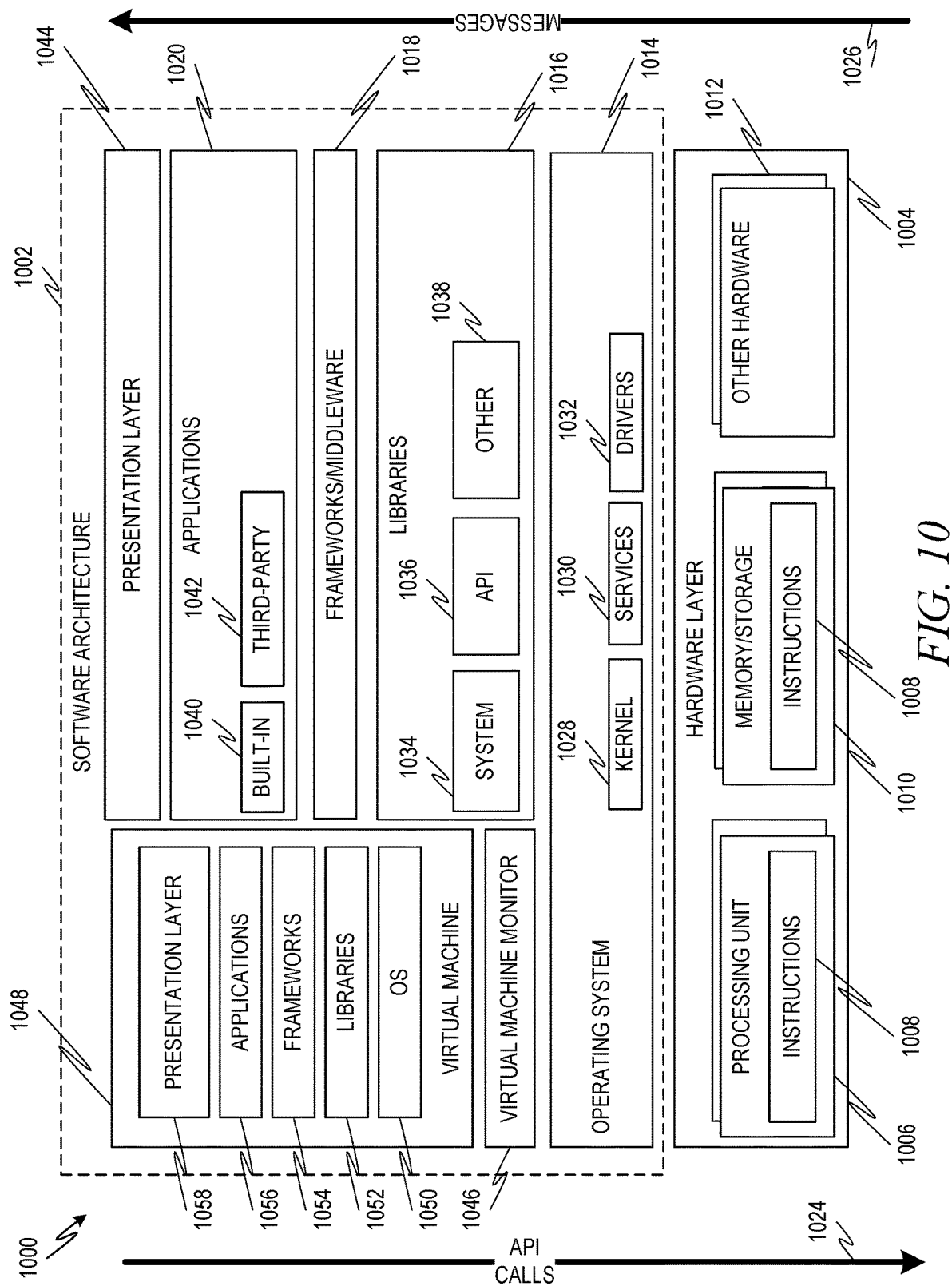
FIG. 10 is a block diagram showing one example of an architecture for a computing device.

FIG. 10 is a block diagram 1000 showing one example of an architecture 1002 for a computing device. The architecture 1002 may be used in conjunction with various hardware architectures, for example, as described herein. FIG. 10 is merely a non-limiting example of an architecture and many other architectures may be implemented to facilitate the functionality described herein. An example hardware layer 1004 is illustrated and can represent, for example, any of the above referenced computing devices. In some examples, the hardware layer 1004 may be implemented according to the architecture of the computer system of FIG. 11.

The hardware layer 1004 comprises one or more processing units 1006 having associated executable instructions 1008. Executable instructions 1008 represent the executable instructions of the architecture 1002, including implementation of the methods, modules, subsystems, components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the architecture 1002.

In the example architecture of FIG. 10, the architecture 1002 may be conceptualized as a stack of layers where each layer provides particular functionality. For example, the architecture 1002 may include layers such as an operating system 1014, libraries 1016, middleware layer 1018, applications 1020, and presentation layer 1044. Operationally, the applications 1020 and/or other components within the layers may invoke API calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The middleware layer 1018 (also sometimes referred to as frameworks) may provide a higher-level common infrastructure that may be utilized by the applications 1020 and/or other software components/modules. For example, the middleware layer 1018 may provide various graphical user interface (GUI) functions, high-level resource management, high-level location services, and so forth. The middleware layer 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of built-in applications 1040 may include, but are not limited to, a contacts application, a browser application, a book reader application, a location application, a median application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030, and/or drivers 1032), libraries (e.g., system 1034, API libraries 1036, and other libraries 1038), and middleware layer 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). An architecture executes within the virtual machine such as an operating system 1050, libraries 1052, frameworks/middleware 1054, applications 1056 and/or presentation layer 1058. These layers of architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
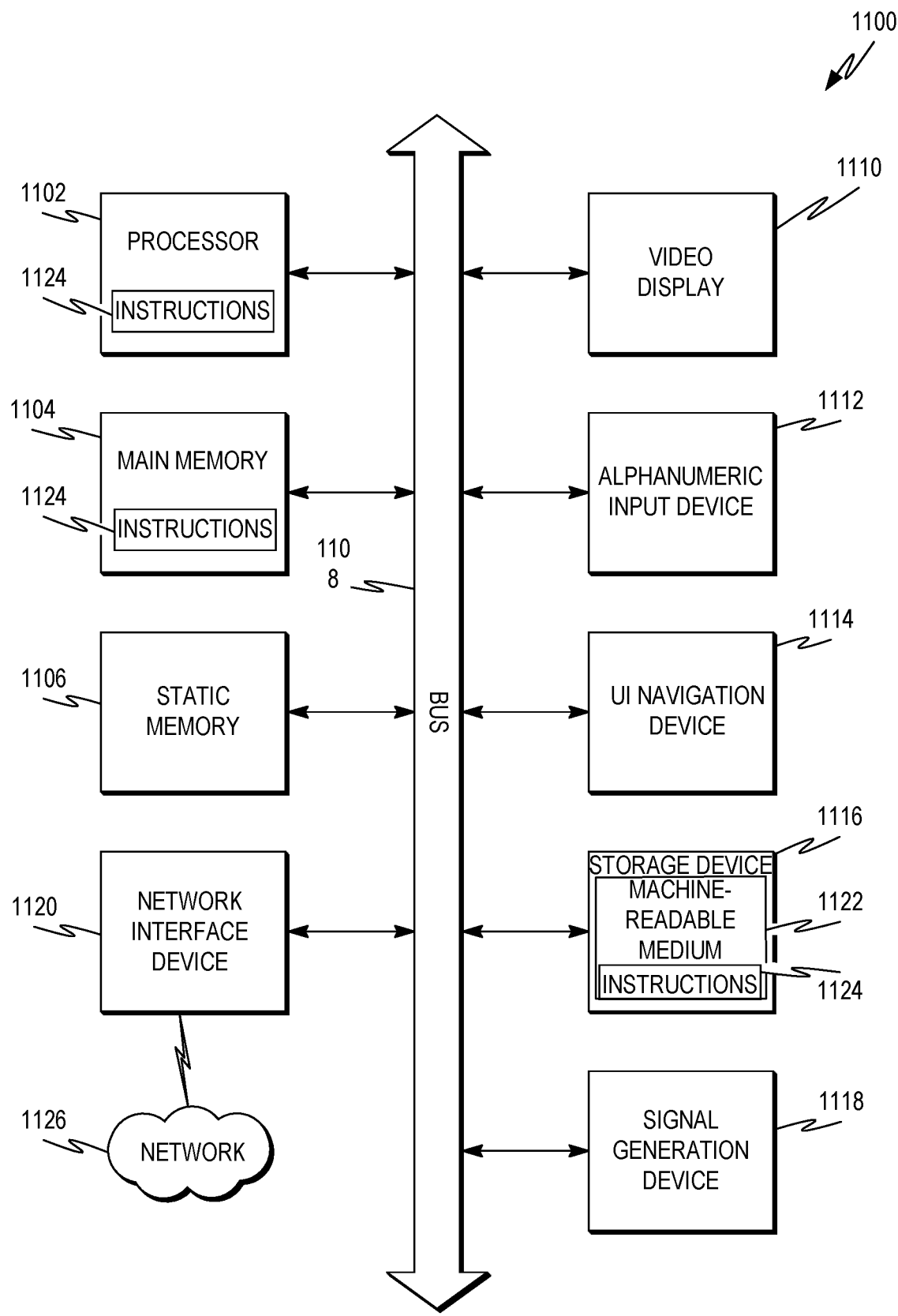
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media, such as medium 1122 and the like include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for evaluating an Application Program Interface (API) for interfacing an application to a database through a data model, the system comprising:
at least one processor programmed to perform operations comprising:
accessing an indication of a first API call to the API, the first API call being a read operation call;
accessing a first view data structure associated with the first API call, the data model being described by a plurality of view data structures based on one or more tables at a database, the plurality of view data structures comprising the first view data structure;
using the first view data structure to select a first table from the one or more tables, the first table being associated with the first API call;
generating a first performance double table corresponding to the first table;
generating a first performance double view data structure corresponding to the first view data structure, the first performance double view data structure being based on the first performance double table; and
measuring the API against a standard of performance for the API, the measuring using the first performance double view data structure and the first performance double table.

2. The system of claim 1, the operations further comprising:
receiving an indication that the standard of performance for the API has changed; and
prompting the measuring of the API against the standard of performance for the API in response to receiving the indication that the standard of performance for the API has changed.

3. The system of claim 1, the operations further comprising:

receiving an indication that the first view data structure has changed;
generating a second performance view data structure corresponding to the first view data structure; and
prompting the measuring of the API against the standard of performance for the API in response to receiving the indication that the first view data structure has changed.

4. The system of claim 1, the operations further comprising:
receiving an indication that the first table has changed;
generating a second performance double table corresponding to the first table; and
prompting the measuring of the API against the standard of performance for the API in response to receiving the indication that the first table has changed.

5. The system of claim 1, the operations further comprising generating a performance double API using the first performance double table and the first performance double view data structure, the measuring of the API against the standard of performance comprising measuring the performance double API against the standard of performance.

6. The system of claim 1, the measuring of the API against the standard of performance for the API comprises:
accessing the first performance double table from a cold storage location;
accessing the first performance double view data structure from the cold storage location;
accessing a performance double API from the cold storage location;
determining a response of the performance double API using the first performance double table and the first performance double view data structure; and
comparing the response of the performance double API and the standard for performance for the API.

7. The system of claim 1, the operations further comprising:
accessing the first performance double table;
using the standard of performance for the API to determine a number of data records for the first table; and
generating first performance double data for the first table, the first performance double data having the number of data records, the measuring of the API against the standard of performance also using the first performance double data.

8. The system of claim 1, the operations further comprising:
accessing an indication of a second API call to the API, the second API call being a write operation call;
accessing sample data from the database;
generating second performance double data, the second performance double data being based at least in part on the sample data; and
measuring the API against a second standard of performance for the API, the measuring using the second performance double data.

9. A method for evaluating an Application Program Interface (API) for interfacing an application to a database through a data model, the method comprising:
accessing an indication of a first API call to the API, the first API call being a read operation call;
accessing a first view data structure associated with the first API call, the data model being described by a plurality of view data structures based on one or more tables at a database, the plurality of view data structures comprising the first view data structure;
using the first view data structure to select a first table from the one or more tables, the first table being associated with the first API call;
generating a first performance double table corresponding to the first table;
generating a first performance double view data structure corresponding to the first view data structure, the first performance double view data structure being based on the first performance double table; and
measuring the API against a standard of performance for the API, the measuring using the first performance double view data structure and the first performance double table.

10. The method of claim 9, further comprising:
receiving an indication that the standard of performance for the API has changed; and
prompting the measuring of the API against the standard of performance for the API in response to receiving the indication that the standard of performance for the API has changed.

11. The method of claim 9, further comprising:
receiving an indication that the first view data structure has changed;
generating a second performance view data structure corresponding to the first view data structure; and
prompting the measuring of the API against the standard of performance for the API in response to receiving the indication that the first view data structure has changed.

12. The method of claim 9, further comprising:
receiving an indication that the first table has changed;
generating a second performance double table corresponding to the first table; and
prompting the measuring of the API against the standard of performance for the API in response to receiving the indication that the first table has changed.

13. The method of claim 9, further comprising generating a performance double API using the first performance double table and the first performance double view data structure, the measuring of the API against the standard of performance comprising measuring the performance double API against the standard of performance.

14. The method of claim 9, the measuring of the API against the standard of performance for the API comprises:
accessing the first performance double table from a cold storage location;
accessing the first performance double view data structure from the cold storage location;
accessing a performance double API from the cold storage location;
determining a response of the performance double API using the first performance double table and the first performance double view data structure; and
comparing the response of the performance double API and the standard for performance for the API.

15. The method of claim 9, further comprising:
accessing the first performance double table;
using the standard of performance for the API to determine a number of data records for the first table; and
generating first performance double data for the first table, the first performance double data having the number of data records, the measuring of the API against the standard of performance also using the first performance double data.

16. The method of claim 9, further comprising:
accessing an indication of a second API call to the API, the second API call being a write operation call;
accessing sample data from the database;

generating second performance double data, the second performance double data being based at least in part on the sample data; and measuring the API against a second standard of performance for the API, the measuring using the second performance double data.

17. A non-transitory machine-readable medium having instructions thereon that, when executed by at least one processor, cause the at least one processor to perform operations comprising:

accessing an indication of a first API call to an API, the first API call being a read operation call, the API being for interfacing an application to a database through a data model;

accessing a first view data structure associated with the first API call, the data model being described by a plurality of view data structures based on one or more tables at a database, the plurality of view data structures comprising the first view data structure;

using the first view data structure to select a first table from the one or more tables, the first table being associated with the first API call;

generating a first performance double table corresponding to the first table;

generating a first performance double view data structure corresponding to the first view data structure, the first performance double view data structure being based on the first performance double table; and measuring the API against a standard of performance for the API, the measuring using the first performance double view data structure and the first performance double table.

18. The medium of claim 17, further comprising:

receiving an indication that the standard of performance for the API has changed; and prompting the measuring of the API against the standard of performance for the API in response to receiving the indication that the standard of performance for the API has changed.

19. The medium of claim 17, further comprising:

receiving an indication that the first view data structure has changed;

generating a second performance view data structure corresponding to the first view data structure; and prompting the measuring of the API against the standard of performance for the API in response to receiving the indication that the first view data structure has changed.

20. The medium of claim 17, further comprising:

receiving an indication that the first table has changed;

generating a second performance double table corresponding to the first table; and prompting the measuring of the API against the standard of performance for the API in response to receiving the indication that the first table has changed.

* * * * *